United States Patent [19]

Cash et al.

[11] Patent Number: 5,372,405
[45] Date of Patent: Dec. 13, 1994

[54] ADJUSTABLE FLAT-BACK FLOOR SITTER CHAIRS

[76] Inventors: John T. Cash; Valerie T. Cash, both of 10 Hyde Rd., Havelock, N.C. 28532

[21] Appl. No.: 181,806

[22] Filed: Jan. 18, 1994

[51] Int. Cl.⁵ .............................................. B60N 2/02
[52] U.S. Cl. .................... 297/383; 297/219.12; 297/227; 297/229; 297/411.36; 297/440.13; 297/467
[58] Field of Search .................. 297/383, 219.12, 227, 297/219.1, 229, 256.1, 411.25, 411.27, 411.36, 440.13, 440.15, 440.2, 440.21, 467, 468

[56] References Cited

U.S. PATENT DOCUMENTS

| | | | |
|---|---|---|---|
| 1,465,291 | 8/1923 | Walker | 297/383 X |
| 1,685,770 | 10/1928 | Bowen | 297/383 X |
| 2,177,174 | 10/1939 | Eccles | 297/423.45 |
| 3,992,057 | 11/1976 | Studebaker | 297/467 |
| 4,854,638 | 8/1989 | Marcus et al. | 297/440.15 X |
| 5,161,522 | 11/1992 | Clevenger | 297/467 X |

FOREIGN PATENT DOCUMENTS 2813743 10/1979 Germany ............................ 297/383

Primary Examiner—Laurie K. Cranmer
Attorney, Agent, or Firm—Michael J. Colitz, Jr.

[57] ABSTRACT

An adjustable flat-back floor sitter chair comprising a base plate formed in generally rectangular configuration but formed with a trapezoidal leading edge, a pair of parallel side walls extending upwardly from the parallel side edges of the base plate, the side walls being formed with longitudinal slots at various elevations parallel with the side edges of the base plate, a back plate having a lower edge in sliding contact with the upper surface of the base plate and having side edges in sliding contact with the interior faces of the side walls, the back plate being provided with a pair of outwardly projecting bolts extendable through the slots in the side walls with wing nuts for locking the bolts and the back wall in a preselected orientation along the length of the base plate and a plurality of rows of laterally extending apertures formed in the back plate at various elevations adjacent to its side edges.

5 Claims, 4 Drawing Sheets

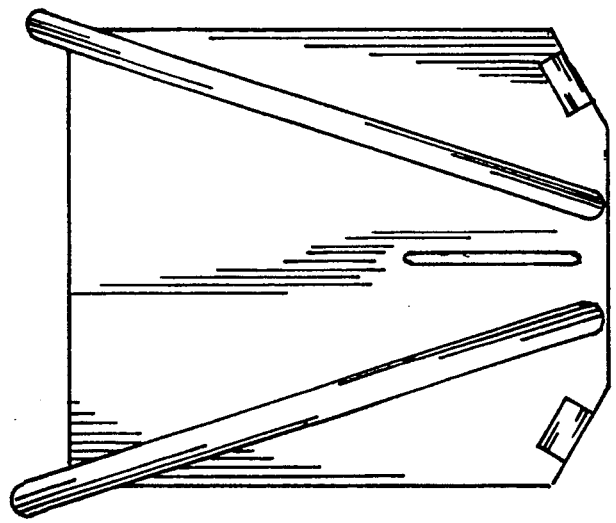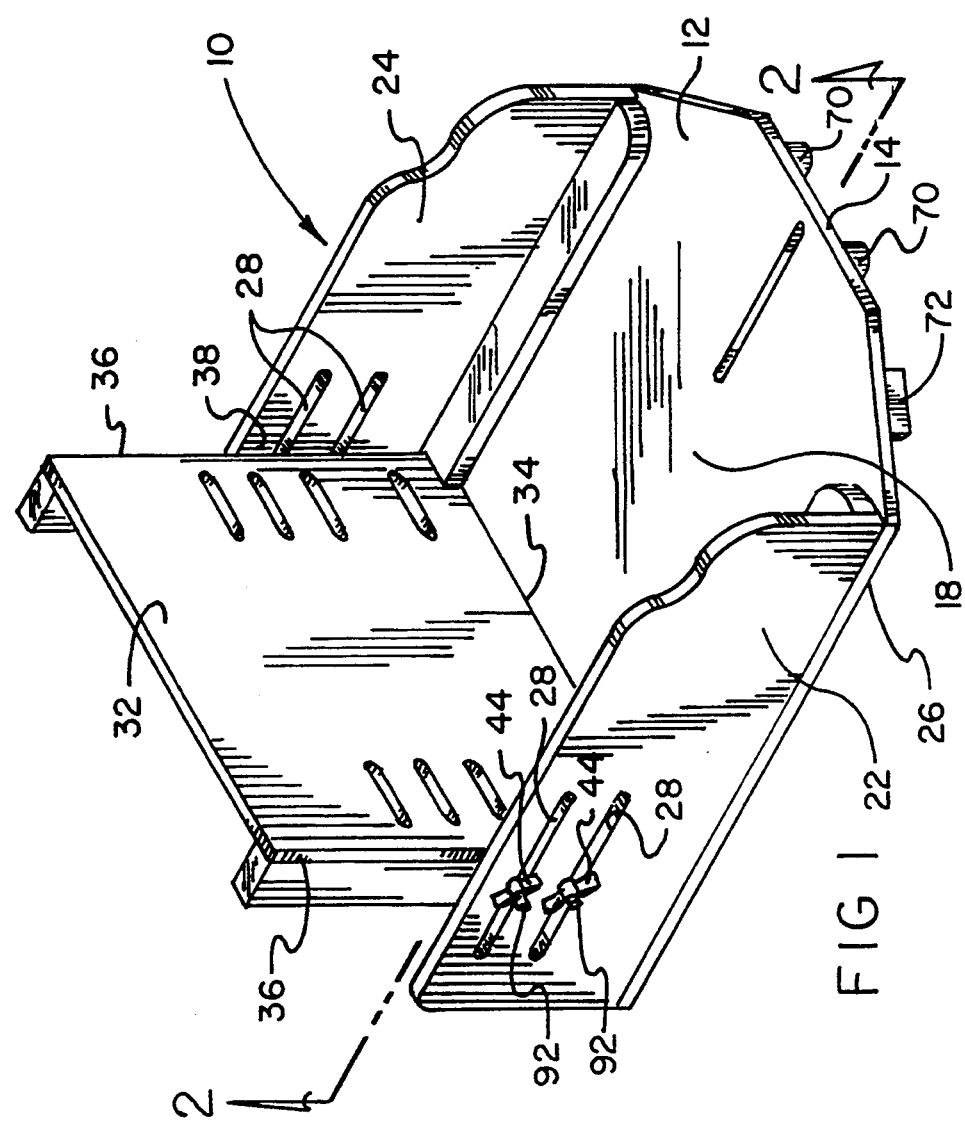

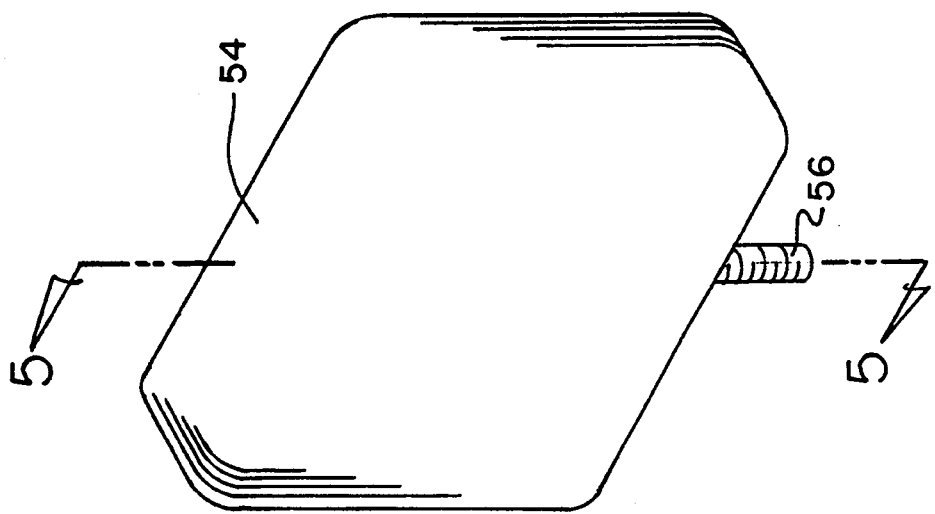
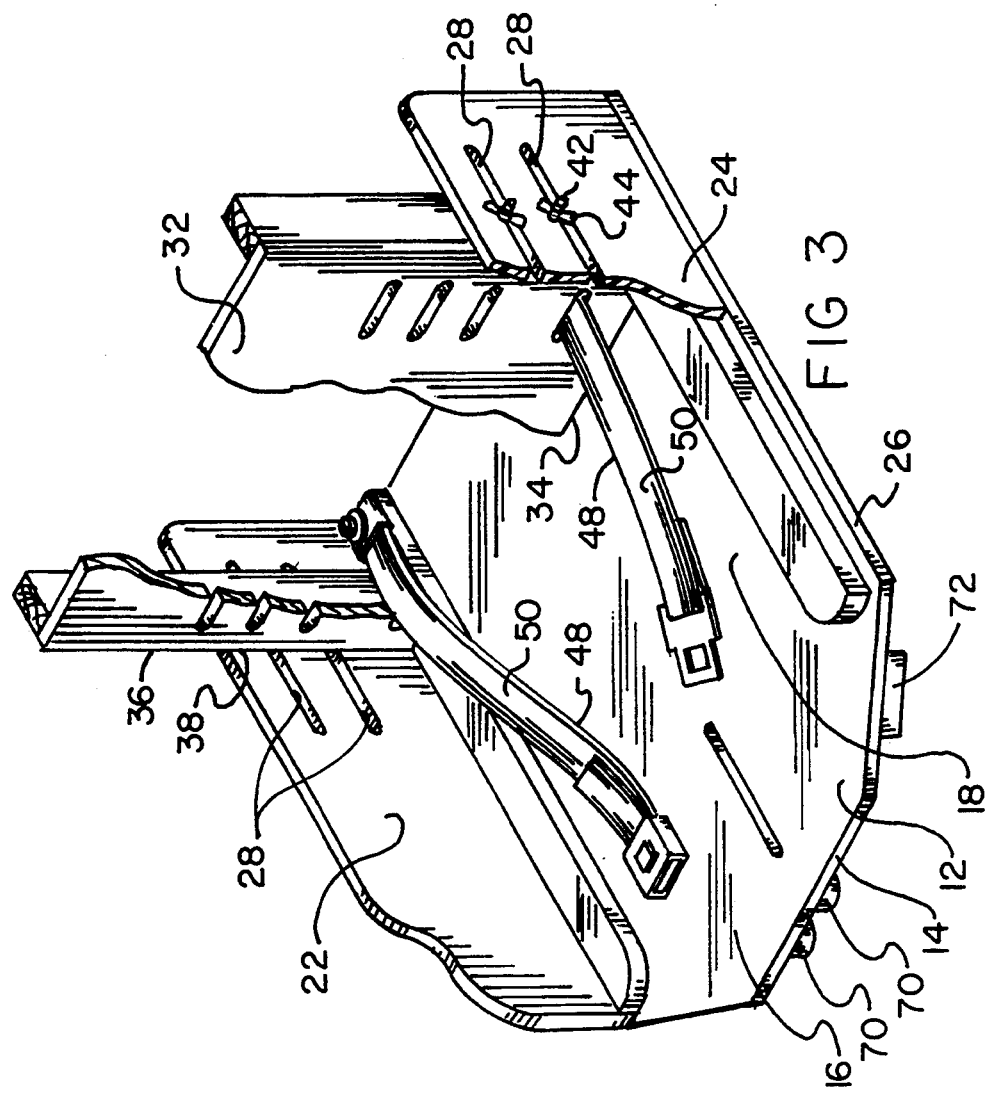

ADJUSTABLE FLAT-BACK FLOOR SITTER CHAIRS

BACKGROUND OF THE INVENTION

1. Field of the Invention

The present invention relates to adjustable flat-back floor sitter chairs and more particularly pertains to providing increased convenience, comfort and adjustability to flat-back or sitter chairs.

2. Description of the Prior Art

The use of chairs is known in the prior art. More specifically, chairs heretofore devised and utilized for the purpose of providing various features to chairs are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,580,631 an invalid chair which includes a first and second frame between which is removably supported a seat assembly which is longitudinally slidable with respect to the side frames.

U.S. Pat. No. 3,672,722 discloses an invalid chair having an adjustable headrest, seat, and footrest.

U.S. Pat. No. 4,249,774 discloses an invalid chair having a seat divided into a central saddle portion and a leg supporting portion.

U.S. Pat. No. 4,393,529 discloses a two-part invalid chair which enables a patient to be easily transferred from a lying position on a bed to a seated position on a chair, or vice versa.

U.S. Pat. No. 4,732,423 discloses an invalid chair having a support frame which includes a main support section, a seat support section pivotable on the main frame section and a back frame section, pivotable on the seat support section of the frame.

In this respect, the adjustable flat-back floor sitter chair according to the present invention substantially departs from the conventional concepts and designs of the prior art, and in doing so provides an apparatus primarily developed for the purpose of providing increased convenience, comfort and adjustability to flat-back or sitter chairs.

Therefore, it can be appreciated that there exists a continuing need for new and improved adjustable flat-back floor sitter chairs which can be used for providing increased convenience, comfort and adjustability to flat-back or sitter chairs. In this regard, the present invention substantially fulfills this need.

SUMMARY OF THE INVENTION

In view of the foregoing disadvantages inherent in the known types of chairs now present in the prior art, the present invention provides improved adjustable flat-back floor sitter chairs. As such, the general purpose of the present invention, which will be described subsequently in greater detail, is to provide new and improved adjustable flat-back floor sitter chairs and method which has all the advantages of the prior art and none of the disadvantages.

To attain this, the present invention essentially comprises a new and improved adjustable flat-back floor sitter chair comprising, in combination a base plate formed in generally rectangular configuration but formed with a trapezoidal leading edge, a pair of parallel side walls extending upwardly from the parallel side edges of the base plate, the side walls being formed with longitudinal slots at various elevations parallel with the side edges of the base plate, a back plate having a lower edge in sliding contact with the upper surface of the base plate and having side edges in sliding contact with the interior faces of the side walls, the back plate being provided with a pair of outwardly projecting bolts extendable through the slots in the side walls with wing nuts for locking the bolts and the back wall in a preselected orientation along the length of the base plate, a plurality of rows of laterally extending apertures formed in the back plate at various elevations adjacent to its side edges, seat belts secured with respect to the base plate on the side of the back plate remote from the front edge of the base plate, the seat belts including flexible straps each extended through a preselected aperture in the back plate, the straps having buckle components at their leading edge thereof for holding a child seated on the base plate with his back on the back plate, a plurality of generally rectangular pillows, each of the pillows having a bolt extending from one edge, the bolts each being positionable through an aperture in the back plate extending forwardly and a supplemental rectangular cushion having a bolt positionable on the base plate and an elongated cushion having separate legs extending forwardly therefrom positionable on the upper surface of the base plate.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved adjustable flat-back floor sitter chairs which have all the advantages of the prior art chairs and none of the disadvantages.

It is another object of the present invention to provide new and improved adjustable flat-back floor sitter chairs which may be easily and efficiently manufactured and marketed.

It is further object of the present invention to provide new and improved adjustable flat-back floor sitter chairs which are of durable and reliable constructions.

An even further object of the present invention is to provide new and improved adjustable flat-back floor sitter chairs which are susceptible of a low cost of manufacture with regard to both materials and labor, and which accordingly are then susceptible of low prices of sale to the consuming public, thereby making such adjustable flat-back floor sitter chairs economically available to the buying public.

Still yet another object of the present invention is to provide new and improved adjustable flat-back floor sitter chairs which provide in the apparatuses and methods of the prior art some of the advantages thereof, while simultaneously overcoming some of the disadvantages normally associated therewith.

Still another object of the present invention is to provide increased convenience, comfort and adjustability to flat-back floor sitter chairs.

Lastly, it is an object of the present invention to provide new and improved adjustable flat-back floor sitter chair comprising a base plate formed in generally rectangular configuration but formed with a trapezoidal leading edge, a pair of parallel side walls extending upwardly from the parallel side edges of the base plate, the side walls being formed with longitudinal slots at various elevations parallel with the side edges of the base plate, a back plate having a lower edge in sliding contact with the upper surface of the base plate and having side edges in sliding contact with the interior faces of the side walls, the back plate being provided with a pair of outwardly projecting bolts extendable through the slots in the side walls with wing nuts for locking the bolts and the back wall in a preselected orientation along the length of the base plate and a plurality of rows of laterally extending apertures formed in the back plate at various elevations adjacent to its side edges.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of adjustable flat-back floor sitter chairs constructed in accordance with the principles of the present invention.

FIG. 2 is a cross-sectional view taken along lines 2—2 of FIG. 1.

FIG. 3 is a perspective view similar to that of FIG. 1 with parts broken away to show certain internal constructions including the seat belts.

FIG. 4 is a cross-sectional view of a pad utilized in association with the device of the prior Figure.

The same reference numerals refer to the same parts through the various Figures.

DESCRIPTION OF THE PREFERRED EMBODIMENT

Figure 6:
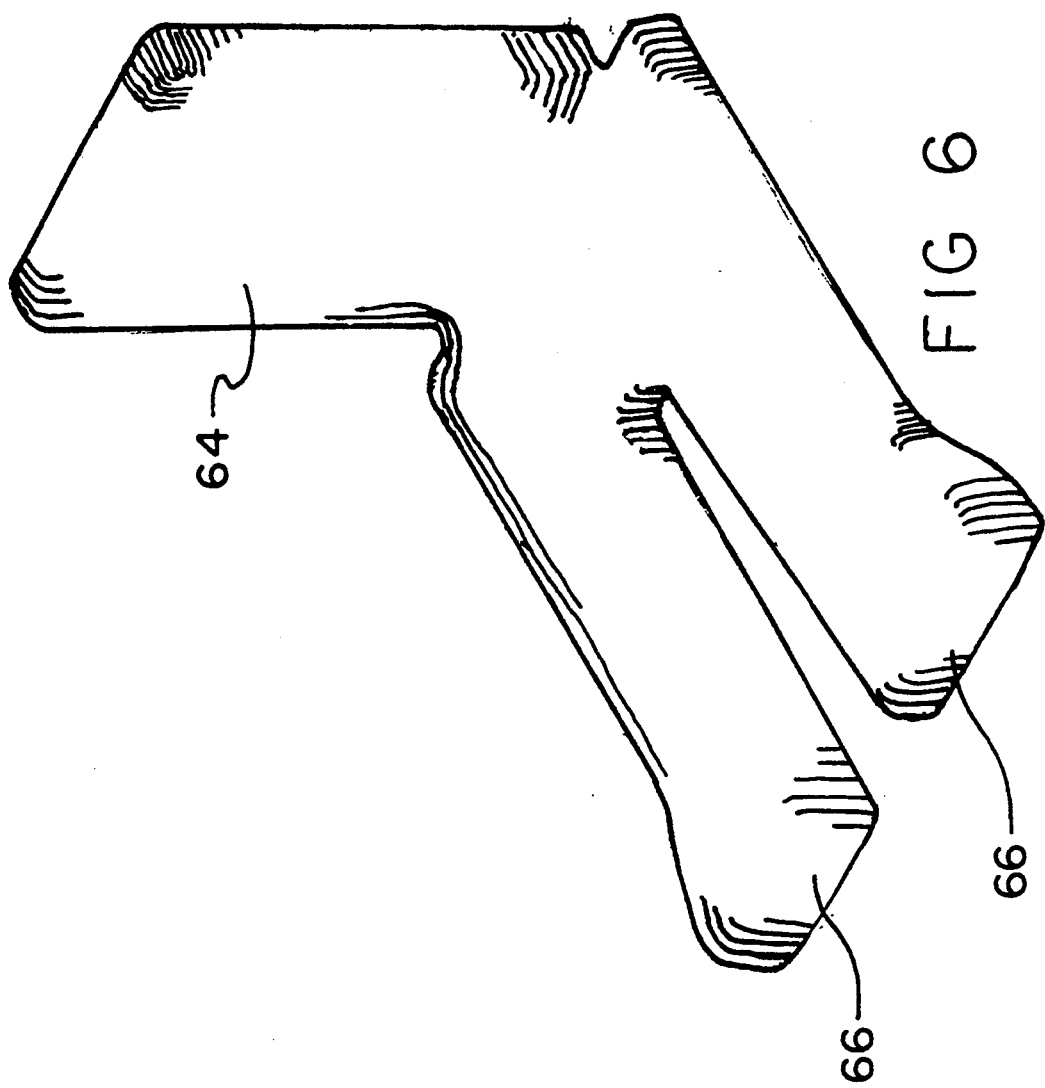
FIG. 6 is a perspective view of another pad utilized in association with the present invention.
Figure 5:
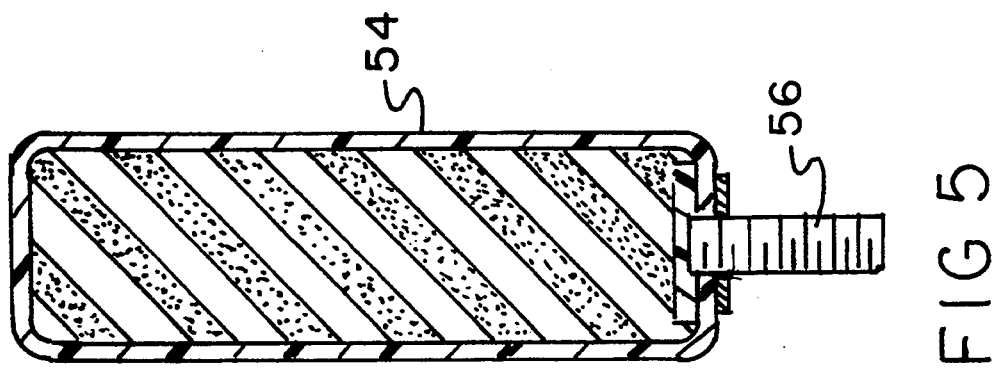
FIG. 5 is a cross-sectional view taken along lines 5—5 of FIG. 4.
Figure 7:
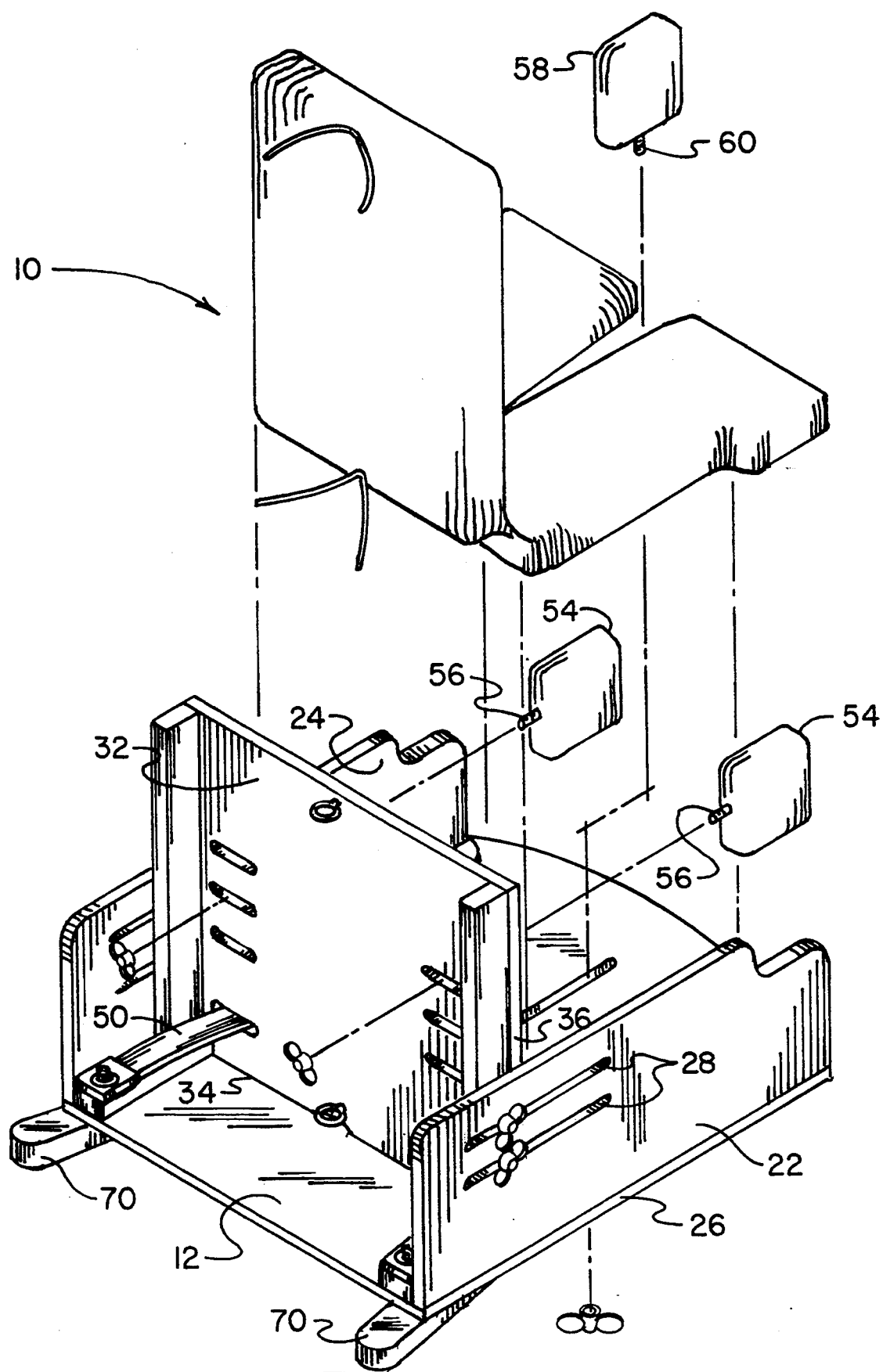
FIG. 7 is an exploded perspective view of the device of the prior Figures.

With reference now to the drawings, and in particular to FIG. 1 thereof, the preferred embodiment of the new and improved adjustable flat-back floor sitter chairs embodying the principles and concepts of the present invention and generally designated by the reference numeral 10 will be described.

Specifically, the present invention, the new and improved adjustable flat-black floor sitter chairs, may be considered as a system 10 comprised of a plurality of components. In its broadest context, the components include a base plate, a pair of parallel side walls, a back plate, a plurality of rows of apertures in the back plate, seat belts, rectangular pillows and a supplemental elongated cushion. Such components are individually configured and cooperatively arranged one with another to effect the desired objective.

More specifically, the system 10 of the present invention has for its first component a base plate 12. The base plate 12 is formed in a generally rectangular configuration. It has, however, at its leading edge 14 a shape in the form of a trapezoid. This results in a planar base plate having a trapezoidal section 16 and a rectangular section 18.

The next major component of the system is a pair of side walls 22 and 24. The side walls extend upwardly from the parallel side edges 26 of the base plate 12. The side walls are formed of a rigid material similar to the base plate 12 and have longitudinal slots 28 formed therein. Such longitudinal slots are at various elevations from the base plate 12 and are parallel with the side edges 26 of the base plate 12.

The next major component of the system 10 is a back plate 32. The back plate 32 has a lower edge 34 at right angles with the side edges. The lower edge 34 is in sliding contact with upper surface of the base plate 12. Its side edges 36 extend upwardly and are in sliding contact with the facing surfaces 38 of the side walls.

The back plate 32 is provided with a pair of outwardly projecting bolts 42. Such bolts 42 lie along a common horizontal axis. They are adapted to extend through slots in the side walls. Associated wing nuts 44 are provided for locking the bolts and back wall in a preselected orientation forwardly and rearwardly along the back plate. Such apertures are at various elevational locations adjacent to its side edges 36.

Greater security to a child located on the device 10 of the present invention is effected through the use of seat belts 48. The seat belts 48 are secured at their rearward end as by bolts. Such location is adjacent to the side of the back plate 12 remote from the front edge of the base plate 12. The seat belts 48 include flexible straps 50. Each strap 50 extends through a preselected aperture in the back plate 12. Such buckle components are for coupling and uncoupling a child seated on the base plate 12. When so seated, the child's back is located adjacent to the back plate 12.

Further, provided as a component of the system 10 is a plurality of pillows. The pillows are formed of a foam interior with a soft exterior skin. The first of the pillow assemblies are side pillows 54. Each of such pillows has a bolt 56 extending from one edge. The bolts 56 each are positionable through an aperture in the associated back plate 12. They extend forwardly thereof for precluding a child injuring himself or herself by lateral movement while located on the chair. In addition, a supplemental rectangular cushion 58 is provided with a bolt 60. Such supplemental cushion 58 is positionable on the base plate 12 and held with respect thereto with a wing nut similar to the securement of the pair of rectangular cushions 58.

The cushion assembly further includes an elongated cushion 64. The elongated cushion 64 has an upper segment adapted to be positioned in contact with the back plate for receiving the back of the child. The elongated cushion 64 also has a pair of separate legs 66 positionable on the leading edge of the base plate 12. The legs of the child rest thereon for greater comfort and safety.

The utility of the device is enhanced through elongated guide strips 70 angled toward each other from rear to front. In addition, front blocks 72 are also provided. Such components minimize lateral sliding of the device 10 during operation and use.

The present invention is for children with disabilities and is to be used as a floor sitting chair. It aids in support while the child sits at floor level.

Floor sitting chairs are presently known as corner sitters and are non-adjustable for growth of the child. The corner chair does not allow for flat shoulder support across the child's back thus rounding the child's shoulders.

The present invention allows for growth which will last many years and gives more back support for proper sitting posture for the child's spine.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved adjustable flat-back floor sitter chair comprising, in combination:
    a base plate formed in generally rectangular configuration but formed with a trapezoidal leading edge, the base plate having an upper surface and a lower surface and a length;
    a pair of parallel side walls extending upwardly from the parallel side edges of the base plate, the side walls being formed with longitudinalrious elevations parallel with the side edges of the base plate, the side walls having interior faces and exterior faces;
    a back plate having a lower edge in sliding contact with the upper surface of the base plate and having side edges in sliding contact with the interior faces of the side walls, the back plate being provided with a pair of outwardly projecting bolts extendable through the slots in the side walls with wing nuts for locking the bolts and the back wall in a preselected orientation a long the length of the base plate;
    a plurality of rows of laterally extending apertures formed in the back plate at various elevations adjacent to its side edges;
    seat belts secured with respect to the base plate, such securement being on the side of the back plate remote from the front edge of the base plate, the seat belts including flexible straps each extended through a preselected aperture in the back plate, the straps having buckle components at their leading edge thereof for holding a child seated on the base plate with his back on the back plate;
    a plurality of generally rectangular pillows, each of the pillows having a bolt extending from one edge, the bolts each being positionable aperture in the back plate extending rearwardly and a supplemental rectangular cushion having a bolt positionable on the base plate; and
    an elongated cushion having separate legs extending forwardly therefrom positionable on the upper surface of the base plate.

2. An adjustable flat-back floor sitter chair comprising:
    a base plate formed in generally rectangular configuration with parallel side edges but formed with a trapezoidal leading edge, the base plate having an upper surface and a lower surface;
    a pair of parallel side walls extending upwardly from the parallel side edges of the base plate, the side walls having interior faces and exterior faces and being formed with longitudinal slots at various elevations parallel with the side edges of the base plate;
    a back plate having a lower edge in sliding contact with the upper surface of the base plate and having side edges in sliding contact with the interior faces of the side walls, the back plate being provided with a pair of outwardly projecting bolts extendable through the slots in the side walls with wing nuts for locking the bolts and the back wall in a preselected orientation along the length of the base plate; and
    a plurality of rows of laterally extending apertures formed in the back plate at various elevations adjacent to its side edges.

3. The device as set forth in claim 2 and further including seat belts bolted with respect to the base plate, such bolting being on the side of the back plate remote from the front edge of the base plate, the seat belts including flexible straps extended through a preselected aperture in the back plate, the straps having buckle components at their leading edge thereof for holding a child seated on the base plate with his back on the back plate.

4. The device as set forth in claim 2 and further including a plurality of generally rectangular pillows, each of the pillows having a bolt extending from one edge, the bolts each being positionable through an aperture in the back plate extending forwardly and a supplemental rectangular cushion having a bolt positionable on the base plate.

5. The device as set forth in claim 2 and further including an elongated cushion having separate legs extending forwardly positionable on the upper surface of the base plate.

* * * * *